United States Patent
Maeda

(10) Patent No.: US 6,922,314 B2
(45) Date of Patent: Jul. 26, 2005

(54) DISK RECORDING OR REPRODUCING DEVICE WITH PICKUP INCLINATION ADJUSTING MECHANISM

(75) Inventor: Osamu Maeda, Ikoma (JP)

(73) Assignees: Sanyo Electric Co., Ltd., Moriguchi (JP); Sanyo Technosound Co., Ltd., Daito (JP)

(*) Notice: Subject to any disclaimer, the term of this patent is extended or adjusted under 35 U.S.C. 154(b) by 140 days.

(21) Appl. No.: 10/467,180

(22) PCT Filed: Feb. 12, 2002

(86) PCT No.: PCT/JP02/01164

§ 371 (c)(1),
(2), (4) Date: Aug. 18, 2003

(87) PCT Pub. No.: WO02/067259

PCT Pub. Date: Aug. 29, 2002

(65) Prior Publication Data

US 2004/0062185 A1 Apr. 1, 2004

(30) Foreign Application Priority Data

Feb. 19, 2001 (JP) ........................................ 2001-041410

(51) Int. Cl.[7] .............................................. G11B 21/16
(52) U.S. Cl. ................. 360/267.2; 360/266.6; 360/267.6; 360/294.7; 720/675
(58) Field of Search ............................ 360/266.6, 267.2, 360/267.6, 294.7; 720/675

(56) References Cited

U.S. PATENT DOCUMENTS

| | | | | |
|---|---|---|---|---|
| 6,704,270 B2 | * | 3/2004 | Moriyama | 720/675 |
| 2001/0022772 A1 | * | 9/2001 | Moriyama | 369/249 |
| 2004/0052199 A1 | * | 3/2004 | Nakashima et al. | 369/249 |
| 2004/0205793 A1 | * | 10/2004 | Lu et al. | 720/675 |

FOREIGN PATENT DOCUMENTS

| | | | |
|---|---|---|---|
| JP | 2001-52346 | | 2/2001 |
| JP | 2001-344767 A | * | 12/2001 |
| JP | 2001-351251 | | 12/2001 |
| JP | 2002-230922 A | * | 8/2002 |

OTHER PUBLICATIONS

International Preliminary Examination Report for PCT/JP02/01164 (English translation).

* cited by examiner

Primary Examiner—Jefferson Evans
(74) Attorney, Agent, or Firm—Armstrong, Kratz, Quintos, Hanson & Brooks, LLP

(57) ABSTRACT

Brackets 9, 9 for supporting respective opposite ends of a guide rod 4 are provided with respective cam faces 95, 95 approximately symmetric about an approximate longitudinal midportion C of the guide rod 4, and at least one of the brackets 9 is provided with an adjusting member for moving the guide rod 4 longitudinally thereof. The cam faces 9 guide the guide rod 4 toward a direction in which the guide rod 4 pivotally moves about the approximate longitudinal midportion C, as the guide rod 4 is moved longitudinally thereof by the adjusting member.

4 Claims, 3 Drawing Sheets

DISK RECORDING OR REPRODUCING DEVICE WITH PICKUP INCLINATION ADJUSTING MECHANISM

TECHNICAL FIELD

The present invention relates to disk recording or playback devices having a tilt adjusting mechanism for tilting a pickup relative to the signal bearing surface of a disk.

BACKGROUND ART

FIG. 4 is a perspective view of a conventional disk recording or playback device. A chassis 1 is provided thereon with a turntable 3 for placing a disk 7 thereon as is well known, and a pickup 2 movable toward or away from the turntable 3. The pickup 2 has an objective 22 on its upper surface and is movable as guided by two guide rods 4, 4 on the chassis 1. Each guide rod 4 has opposite ends fitting in respective brackets 9, 9 on the chassis 1 in the vicinity of the turntable 3.

FIG. 5 is a rear view of the disk 7. Pits 73, 73 are formed in the signal bearing surface of the disk 7 circumferentially thereof. The intensity of light reflected from the disk differs when a laser beam is projected on the pit 73 and when the laser beam is projected on a portion other than the pit 73. This reproduces a digital signal comprising 0 and 1.

Available in recent years are disks 7 adapted to record signals thereon at a high density. These disks are smaller in the spacing D between pits 73, 73 in the radial direction of the disk shown in FIG. 5.

To read the signal recorded at the high density, the objective 22 is given a great numerical aperture (NA, e.g., 0.6) to reduce the diameter of the beam.

When a great numerical aperture is given, it becomes impossible to decrease the beam diameter if the optical axis of the laser beam tilts relative to the disk owing to the refraction of light, presenting difficulty in reading data.

It is further known that when the optical axis of the laser beam tilts slightly relative to the signal bearing surface of the disk 7, coma occurs in proportion to the third power of the numerical aperture and to the thickness of the disk. Coma distorts the waveform of reproduced signals to result in greater jitter. In other words, if the optical axis of the laser beam tilts relative to the signal bearing surface of the disk 7, serious jitter is liable to occur because of the great numerical aperture, hence a need to correct the tilt of optical axis of the laser beam.

It is therefore proposed to provide a mechanism on the chassis 1 for adjusting the tilt of the pickup 2 and to finely adjust the tilt of the pickup 2 during the process for fabricating the disk recording or playback device for smooth reproduction of signals which are recorded on disks at a high density.

FIG. 6 is a view in section taken along a plane containing the line A—A in FIG. 4 and showing the conventional tilt adjusting mechanism, with the pickup 2 omitted.

The two brackets 9, 9 are mounted on the chassis 1 and have respective openings 99 facing inward for the guide rod 4 to fit in. A screw bore 10 is formed in one of the brackets 9 on the chassis 1, and an adjusting screw 6 is driven into the screw bore 10 from below the chassis 1. The guide rod 4 is supported at one end thereof by a projection 97 on the other bracket 9 and at the other end thereof by the adjusting screw 6. Tension springs 40, 40 are attached to and extend between the guide rod 4 and the chassis 1 for biasing the rod 4 downward. The tension springs 40, adjusting screw 6 and brackets 9 provide the adjusting mechanism 5 for tilting the guide rod 4 and the pickup 2 in a plane perpendicular to the chassis 1 and containing the direction of movement of the pickup 2.

To tilt the pickup 2, the adjusting screw 6 is advanced by turning. The guide rod 4 pivotally moves upward from the solid-line position shown in FIG. 6 about the point S of contact between the rod 4 and the bracket 9 against the tension springs 40 as indicated by a chain line. The guide rod 4 may of course be pivotally moved downward. In this way, the tilt of the pickup 2 can be adjusted by an angle α.

However, the above mechanism still remains to be improved as will be described below.

Since the guide rod 4 pivotally moves about the point S of contact of the rod 4 with the bracket 9, the greater the distance of a point on the guide rod 4 from the contact point S, the greater the variation in the level of the point. The pickup 2, which moves along the guide rod 4, is the greatest distance away from the contact point S when the objective 22 on the pickup 2 is opposed to the outermost periphery of the disk.

With reference to FIG. 6, suppose the objective 22 is positioned at a point P on the guide rod 4 when the lens 22 reaches the outermost peripehry of the disk, and the distance from the point P to the contact point S is d. The guide rod 4 is tilted about the contact point S by tilt adjustment, so that at the point P where the objective 22 is the greatest distance away from the contact point S, the adjustment alters the level of the guide rod 4 by a value h given below.

$$h = d \times \sin \alpha$$

Because the brackets 9 are positioned in the vicinity of the turntable 3 as shown in FIG. 4, d, when greatest, is about 60 mm which is the radius of the disk. Since the angle α of adjustment of the guide rod 4 as measured by the present applicant is about 0.3 deg, h is:

$$h = 60 \times \sin 0.3 = 0.26 \text{ mm}$$

In order to focus the beam from the objective 22 on the disk to properly effect focusing servo, the objective 22 is made movable upward or downward by a very small amount. However, if great, the value h will be in excess of the this movable amount, entailing the likelihood that a correct focusing servo operation can not be performed.

An object of the present invention is to diminish the variations in the level of the guide rod which are involved in adjusting the tilt of the guide rod to ensure a correct focusing servo operation.

DISCLOSURE OF THE INVENTION

Brackets 9, 9 for supporting respective opposite ends of a guide rod 4 are provided with respective cam faces 95, 95 approximately symmetric about an approximate longitudinal midportion C of the guide rod 4, and at least one of the brackets 9 is provided with an adjusting member for moving the guide rod 4 longitudinally thereof.

The cam faces 9 guide the guide rod 4 toward a direction in which the guide rod 4 pivotally moves about the approximate longitudinal midportion C, as the guide rod 4 is moved longitudinally thereof by the adjusting member.

BEST MODE OF CARRYING OUT THE INVENTION

An embodiment of the invention will be described below in detail with reference to the drawings.
(Overall Construction)

An embodiment of the invention will be described below in detail with reference to the drawings.

Figure 1:
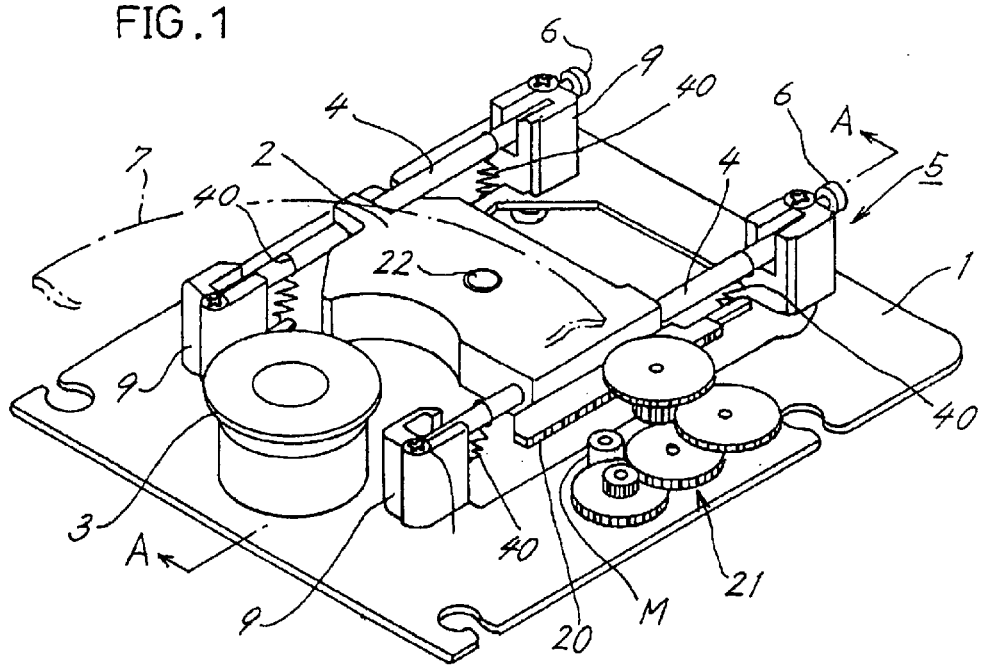
FIG. 1 is a perspective view of a disk recording or playback device.

FIG. 1 is a perspective view of a disk recording or playback device according to the present embodiment. A pickup 2 is movable toward or away from a turntable 3 by being guided by guide rods 4 as in the prior art. The present embodiment is characterized by a mechanism 5 for adjusting the tilt of the guide rod 4 in a plane perpendicular to the upper surface of a chassis 1 and containing the direction of movement of the pickup 2.

A motor M mounted on the chassis 1 at a side portion thereof is coupled by a gear mechanism 21 to a rack 20 provided on a side portion of the pickup 2. When energized, the motor M rotates the gears of the gear mechanism 21 to move the pickup 2 along the guide rods 4.

Brackets 9 of synthetic resin are mounted on the chassis 1 for the respective ends of the guide rods 4. Each guide rod 4 is supported at opposite ends thereof by the brackets 9, 9 and biased downward by tension springs 40 attached to and extending between the chassis 1 and the rod 4. One of the brackets 9 has driven therein an adjusting screw 6 for pushing in the guide rod 4 longitudinally thereof, i.e., toward a direction along the rod. The adjusting screw 6 may be attached to each of the brackets 9, 9. As will be described later, the adjusting screw 6 and the brackets 9 provide the mechanism 5 for adjusting the tilt of the guide rod 4.
[Adjusting the Tilt of Guide Rod]

Figure 2:
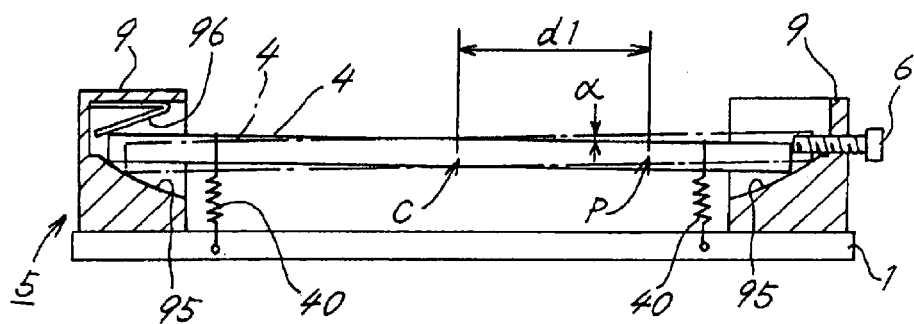
FIG. 2 is a side elevation of FIG. 1 in section taken along a plane containing the line A—A and showing tilt adjustment.

FIG. 2 is a view in section taken along a plane containing the line A—A in FIG. 1 and showing the tilt adjusting mechanism 5, with the pickup 2 omitted. Each bracket 9 is provided with a cam face 95 facing inward and inclined downward, and the end of the guide rod 4 is in contact with the cam face 95. The cam face 95 may be a slope or a circular-arc face bulging downward. The opposed cam faces 95, 95 are approximately symmetric about the approximate longitudinal midportion C of the guide rod 4. One end of the guide rod 4 is pushed obliquely downward by a plate spring 96 inside the bracket 9, and the guide rod 4 is biased toward the adjusting screw 6.

The adjusting screw 6 is in contact with the end face of the guide rod 4. When the adjusting screw 6 is rotated against the plate spring 96, the guide rod 4 is guided by the cam faces 95 to pivotally move in a plane approximately perpendicular to the upper surface of the chassis 1 and containing the direction of movement of the pickup 2.

With reference to FIG. 2, the position of the guide rod 4 before adjustment is indicated in a chain line. When advanced by being turned, the adjusting screw 6 pushes the guide rod 4 toward the bracket 9 on the opposite side. The right end of the guide rod 4 moves down the cam face 95, while the left end of the guide rod 4 moves up the cam face 95. Since the opposite cam faces 95, 95 are symmetric about the approximate midportion C of the guide rod 4, the guide rod 4 pivotally moves clockwise about the point C which is the midpoint between the two cam faces 95, 95. The guide rod 4 reaches a position indicated in a solid line.

Conversely, if the adjusting screw 6 is loosened, the guide rod 4, which is pushed by the plate spring 96, has its left end moved down the cam face 95 and has its right end moved up the cam face 95. The guide rod 4 is pivotally moved counterclockwise about the point C.

Figure 6:
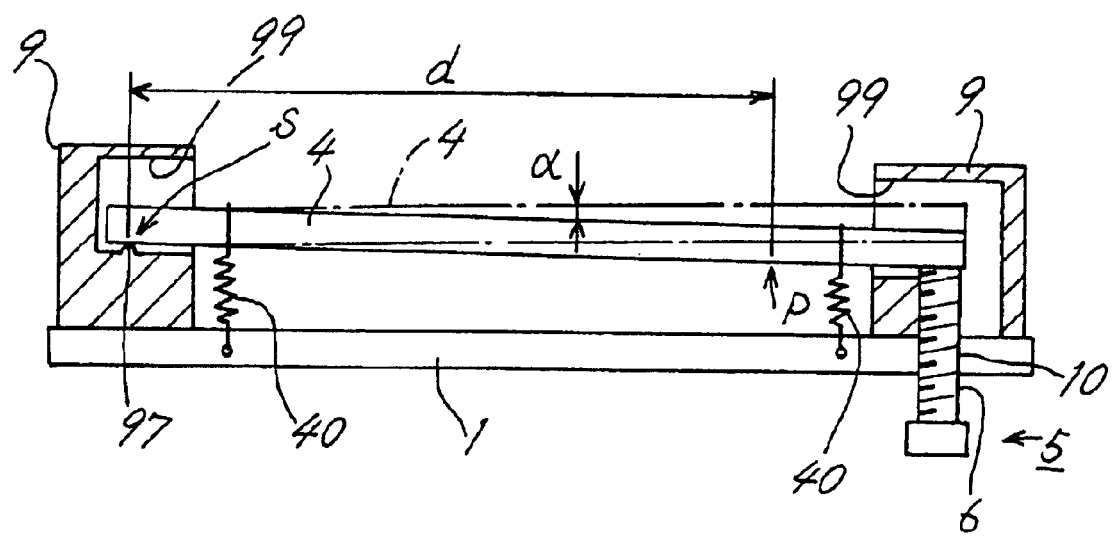
FIG. 6 is a side elevation in section taken along a plane containing the line A—A in FIG. 4.

Thus, the distance d1 from a point P on the guide rod 4 where the objective 22 is positioned when the lens 22 is opposed to the outermost periphery of the disk to the center of pivotal movement, C, of the guide rod 4 is smaller than the distance d in the prior art (see FIG. 6), so that the variation h1 in the level of the guide rod 4 due to the adjustment of tilt of the guide rod 4 is:

$$h1 = d1 \times \sin \alpha$$

The variation h1 is smaller than the variation h of level in the prior art, and is approximately one-half the conventional variation h. This ensures a correct focusing servo operation for the proper playback of the disk.
[Adjusting the Level of Guide Rod]

According to the present embodiment, the guide rod 4 can be moved upward or downward while holding the posture of the guide rod 4 relative to the chassis 1, i.e., while holding the guide rod 4 in parallel to the chassis 1.

Figure 3:
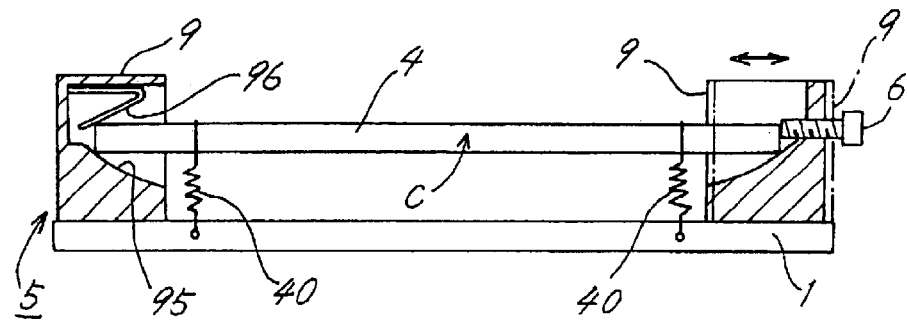
FIG. 3 is a side elevation in section taken along a plane containing the line A—A in FIG. 1 and showing adjustment of level.
Figure 4:
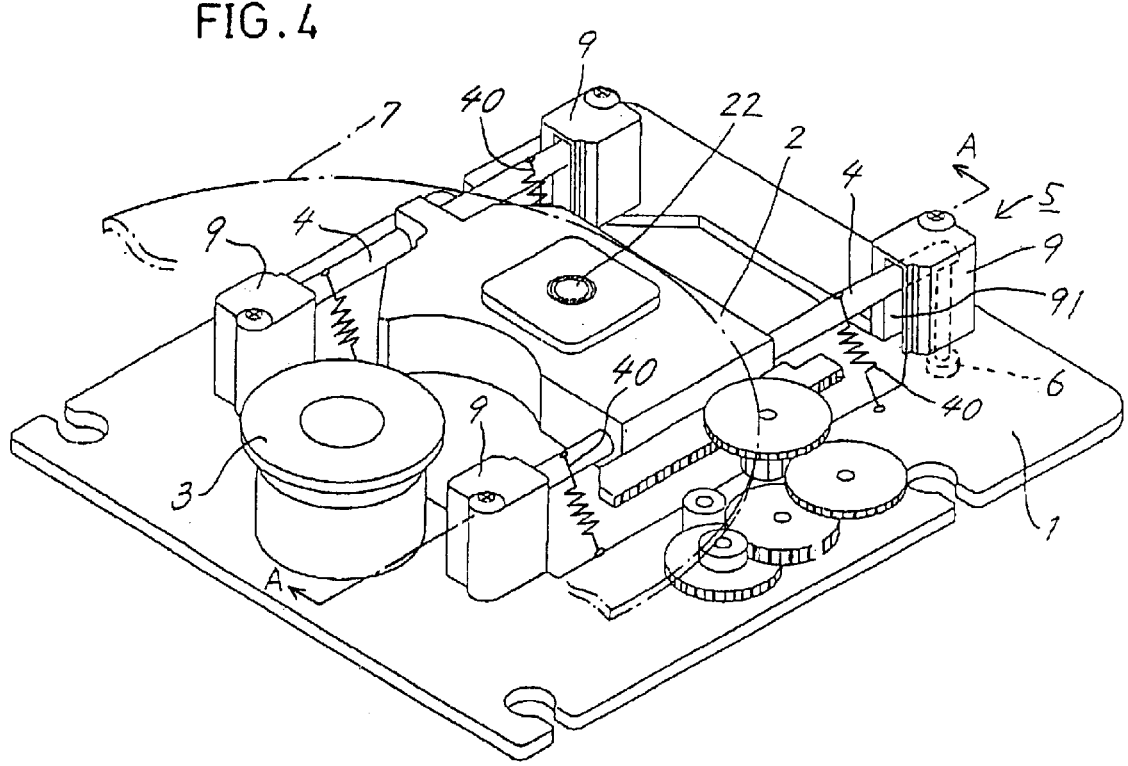
FIG. 4 is a perspective view of a conventional disk recording or playback device.
Figure 5:
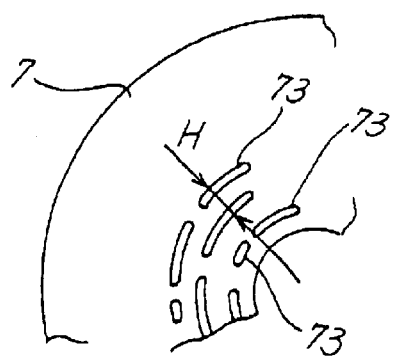
FIG. 5 is a rear view of a disk.

With reference to FIG. 3, at least one of the brackets 9 is mounted so as to be movable leftward or rightward. The bracket 9 is thus made laterally movable by a known arrangement, as by forming a slit (not shown) elongated along the guide rod 4 in the portion of the chassis 1 to be covered with the bracket 9 and driving a screw into the bracket 9 through the slit from below the chassis 1.

When the bracket 9 at right is moved toward the other bracket 9, i.e., leftward in FIG. 3, the opposite ends of the guide rod 4 move up the respective cam faces 95, 95. Conversely if the bracket 9 at right is moved away from the other bracket 9, i.e., rightward in FIG. 3, the opposite ends of the guide rod 4 move down the cam faces 95, 95.

In this way, the longitudinal midportion C of the guide rod 4 can be moved upward or downward. Thus, utilizing, for example, the focusing servo voltage, the guide rod 4 can be positioned in advance at a level enabling the pickup 2 to exhibit its performance most properly, by moving the bracket 9 leftward or rightward and thereby moving the guide rod 4 upward or downward.

Subsequently, the guide rod 4 can be pivotally moved in a plane approximately perpendicular to the upper surface of the chassis 1 and containing the direction of movement of the pickup 2 by turning the adjusting screw 6. This makes it possible to play back a disk which is warped or which rotates with its plane wobbling greatly.

It appears feasible to adjust the tilt of the guide rod 4 while recognizing the jitter of reproduced signal. More specifically, the tilt of the guide rod 4 is adjusted by turning the adjusting screw 6, while playing back a disk having a test reference signal recorded thereon and recognizing the jitter of the reproduced signal, i.e., time axis variations of the reproduced signal. The adjustment is discontinued when the jitter becomes most acceptable. Alternatively, the adjustment may be made while recognizing the error rate of reproduced signal, i.e., the proportion to the bit rows of the reference signal of the bit rows which pickup 2 failed to reproduce correctly.

INDUSTRIAL APPLICABILITY

A guide rod 4 is pivotally moved about the approximate longitudinal midportion C along cam faces 95 by turning an adjusting member. Since the guide rod 4 was pivotally moved about one end thereof supported by a bracket 9 according to the prior art as described above, the invention decreases the variation h in the level of the guide rod 4 due to tilt adjustment. This ensures a correct focusing servo operation for the proper playback of disks.

What is claimed is:

1. A disk recording or playback device comprising as mounted on a chassis a turntable for rotating a disk, a pickup movable toward or away from the turntable, a guide rod extending in the direction of movement of the pickup for guiding the movement of the pickup and an adjusting mechanism for altering the tilt angle of the guide rod in a plane approximately perpendicular to an upper surface of the chassis and containing the direction of movement of the pickup, the adjusting mechanism having brackets for supporting respective opposite ends of the guide rod, the disk recording or playback device being characterized in that the two brackets are provided with respective cam faces approximately symmetric about an approximate longitudinal midportion C of the guide rod, at least one of the brackets being provided with an adjusting member for moving the guide rod longitudinally thereof, the cam faces being adapted to guide the guide rod toward a direction in which the guide rod pivotally moves about the approximate longitudinal midportion C, as the guide rod is moved longitudinally thereof by the adjusting member.

2. A disk recording or playback device according to claim 1 wherein the guide rod is guided by the cam faces toward a direction to move upward or downward as the bracket moves longitudinally of the guide rod.

3. A disk recording or playback device according to claim 2 wherein the bracker is provided with a spring for biasing the guide rod toward the cam face.

4. A disk recording or playback device according to claim 1 wherein the bracket is provided with a spring for biasing the guide rod toward the cam face.

* * * * *